Aug. 29, 1967    D. J. HARDY ETAL    3,338,175
VEHICLES

Filed March 18, 1965    5 Sheets-Sheet 3

Aug. 29, 1967　　D. J. HARDY ETAL　　3,338,175
VEHICLES

Filed March 18, 1965　　　　　　　　　　　　5 Sheets-Sheet 4

United States Patent Office 3,338,175
Patented Aug. 29, 1967

3,338,175
VEHICLES
Derek James Hardy, Cowes, Isle of Wight, and Alfred Reginald Pearson, Ventnor, Isle of Wight, England, assignors to Westland Aircraft Limited, Yeovil, England
Filed Mar. 18, 1965, Ser. No. 440,864
Claims priority, application Great Britain, Apr. 8, 1964, 14,414/64
5 Claims. (Cl. 104—23)

This invention relates to air cushion vehicles which in at least one phase of their operation are wholly or partially supported on a cushion or cushions of air or gas and operate over a prepared track. More particularly, this invention relates to such vehicles which, in their role as air cushion vehicles, have critical roll stability problems.

When an air cushion vehicle operating over a substantially flat prepared track is guided along the track by wheels, of the type generally known as caliper wheels, which are attached to the vehicle so that they rotate in a horizontal plane and run along either side of a central vertical strip, wall or monorail, the guidance force generated by the wheel acts in a horizontal plane which is below the centre of gravity of the vehicle. Thus every time a guidance force is produced by the wheels a rolling couple is induced into the vehicle. Compartmentation of the air cushion for stability purposes is well known and it has been appreciated that to substantially seal the gap that exists between the underside of the vehicle and the top of the aforementioned guidance strip, thereby dividing the cushion into two longitudinally disposed compartments, would give the vehicle added roll stability.

It is an object of the present invention to provide an air cushion vehicle of the type set forth with a longitudinal air barrier, arranged so that it retains its effectiveness when co-operating with a central guidance strip which is not always coincident with the longitudinal centre line of the vehicle.

It is known to provide a flexible or flaccid skirt assembly around the periphery of an air cushion vehicle to retard the escape of air or gas from the supporting cushion. In a skirt arrangement for air cushion rail vehicles it will be obvious that at the front and rear of the vehicle the skirts will be specially shaped to allow the guidance strip to pass through them without permanently crumpling them in those regions. This is achieved simply by providing a suitable slot in the skirts, but crumpling will still occur when the vehicle negotiates bends or curves in the track.

It is a further object of the invention to provide, adjacent the guidance strip, an efficient barrier to the escape of pressurised air from the air cushion.

Accordingly the invention consists of an air cushion vehicle supported by at least two cushions of pressurised air or gas and adapted to operate over a prepared track which has a raised central portion, the said vehicle being provided with means to minimise the escape of pressurised air from the cushions to the atmosphere and from one cushion to another, the said means being arranged such that the sealing characteristic is maintained when the line of the said portion deviates from the longitudinal centre line of the vehicle.

In another aspect the invention provides an air cushion vehicle adapted to operate over a prepared track, in which the barrier to the escape of the air cushion is arranged around a central strip on the said track, such that the said barrier remains operative when the line of said central strip deviates from the longitudinal centre line of the vehicle.

Barriers to divide the air cushion of an air cushion vehicle into compartments for stability purposes have already been described as for example in British Patent No. 952,126. Such barriers, however, co-operate with the flat surface over which a free ranging air cushion vehicle operates and are unsuitable to co-operate with a central guidance strip on a prepared track. Furthermore, when an air cushion vehicle, guided by caliper wheels co-operating with a guidance strip over a prepared track, is led around a curve by a strip, the curved strip deviates from the centre line of the vehicle. This deviation is at a minimum at the position of the caliper wheels, and it increases from the caliper wheel positions, both towards the centre of the vehicle and towards each end of the vehicle. The actual amount of deviation will depend upon such factors as the radius of the curve around which the vehicle is being guided, the length of the vehicle and the location on the vehicle of the caliper wheels.

The invention will now be described by way of example with reference to the accompanying drawings, in which.

Figures 1, 5:
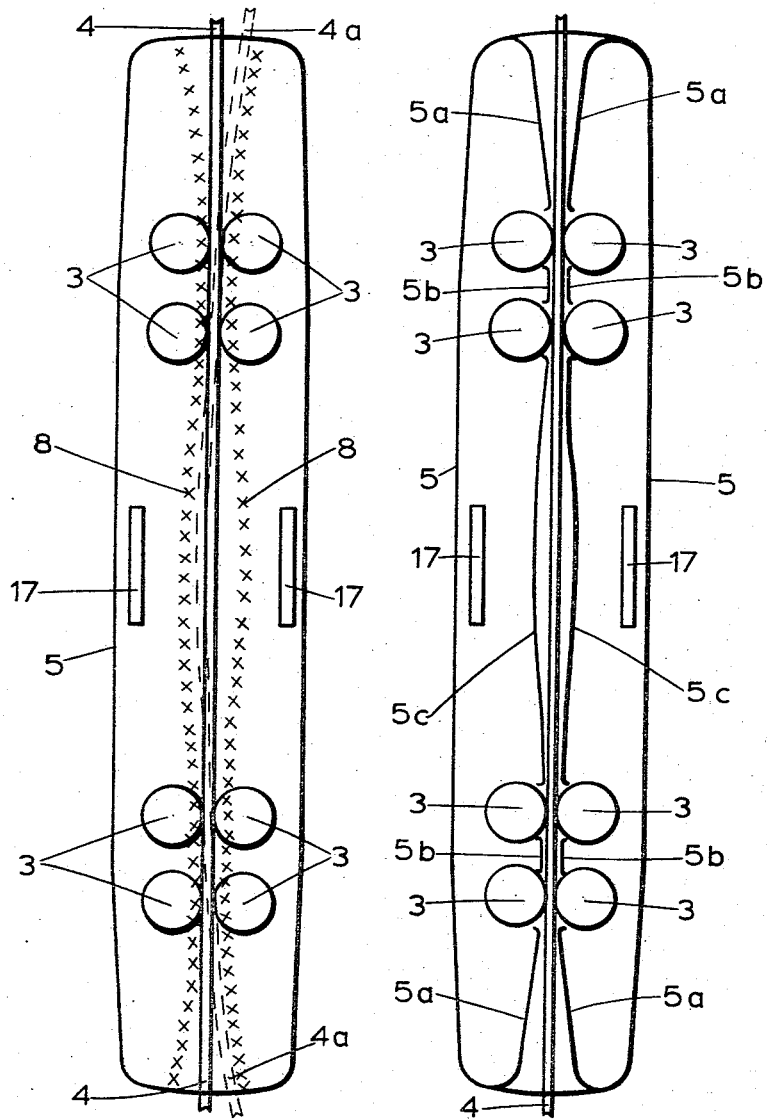
FIGURE 1 is an inverted planview of an air cushion vehicle of the type described on which has been superimposed the position of the guidance strip, and showing the locations of the inflatable sealing member.
FIGURE 5 is an inverted planview illustrating another embodiment of the invention.

In the preferred embodiment of the invention now to be described, we provide a vehicle which in at least one phase of its operation is wholly or partially supported on a cushion of air generated between its underside 1 and the track 2 over which it is operating. Caliper wheels 3 running along opposite sides of the guidance strip 4 guide the vehicle and may also provide a propulsion. Skirts 5, which may be rigid or flaccid, retain the air cushion which is supplied with pressurized air by fans (not shown) through ducts 17 in the underside 1 of the vehicle.

Figure 2:
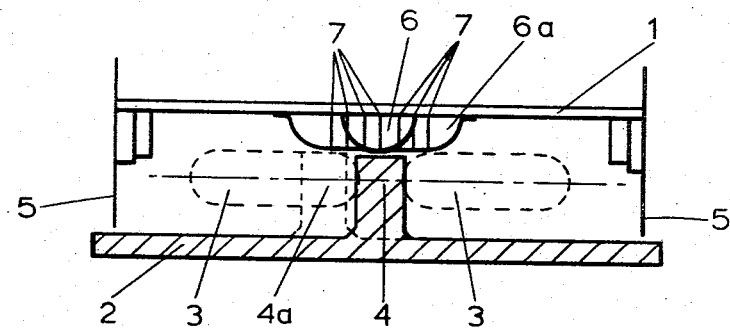
FIGURE 2 is a composite section of the underfloor area of the vehicle illustrated in FIGURE 1 on a different scale.
Figure 3:
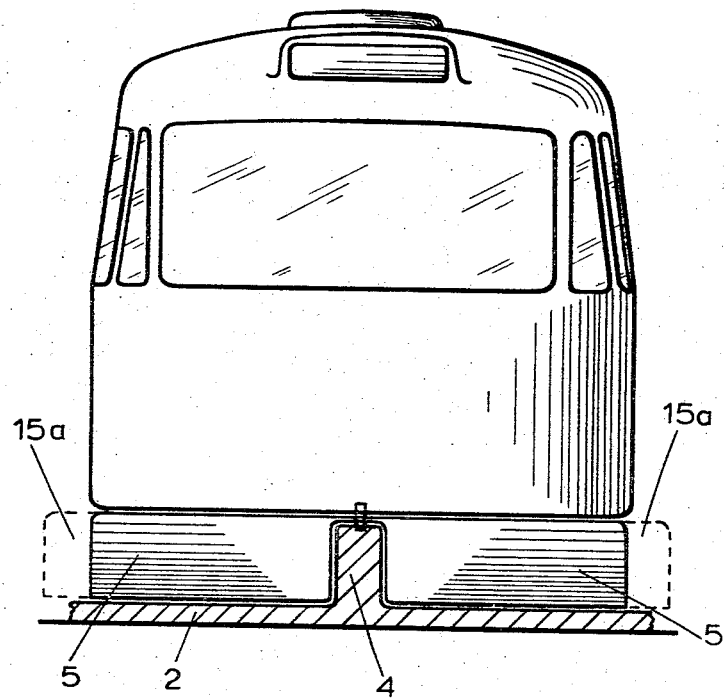
FIGURE 3 is an end view of the same vehicle illustrating one way of effecting a seal around the guidance strip.
Figure 4:
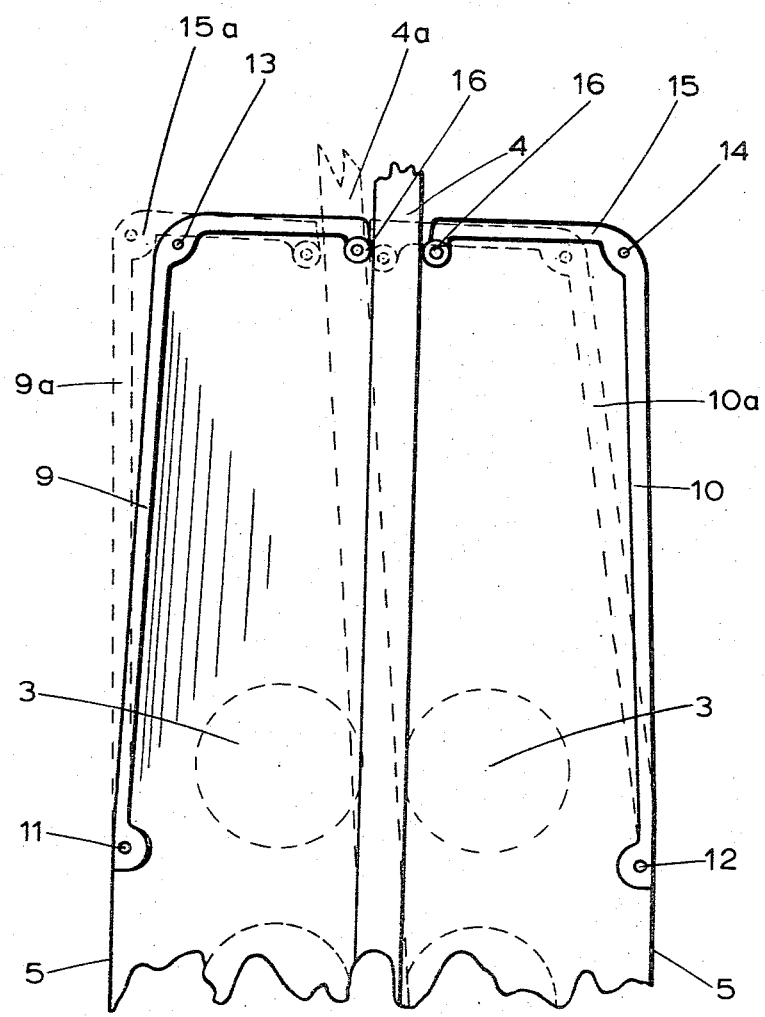
FIGURE 4 is an inverted planview of part of the vehicle illustrating the frame which forms a seal around the guidance strip.
Figure 6:
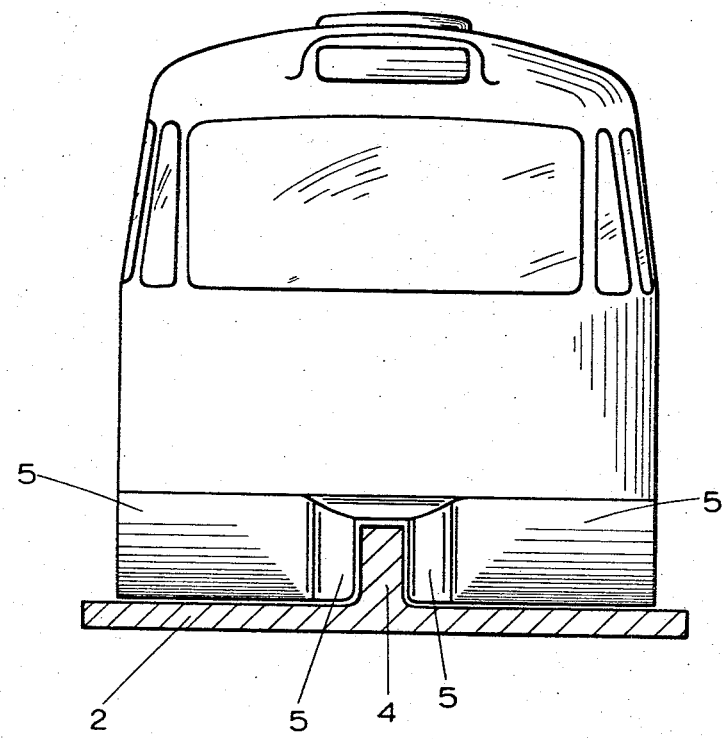
FIGURE 6 is an end view of a different scale of the air cushion vehicle illustrated in FIGURE 5.

Depending from the underside 1 of the vehicle for substantially the whole of its length is an inflatable flexible member 6 which is coaxial with and symmetrical about the longitudinal centre line of the vehicle. The cross-section of the inflatable member varies along the length of the vehicle, the smallest cross-section, preferably substantially semi-circular, being located adjacent each position of the caliper wheels 3 and the width of the inflatable member increasing as the location moves away from a position adjacent the caliper wheels. The greatest width, illustrated as 6a in FIGURE 2, is at the centre and at the centre and at the front and rear of the vehicle.

In order for the inflatable member 6 to co-operate with the guidance strip 4 and provide an effective seal it is necessary that the depth of the member 6 is substantially constant throughout its varying sections, and that the depth is almost equal to the dimension of the gap which exists between the top of the guidance strip 4 and the underside 1 of the vehicle. The depth of the member 6 is maintained constant by the provision of vertical restraining members or diaphragms 7.

Figure 7:
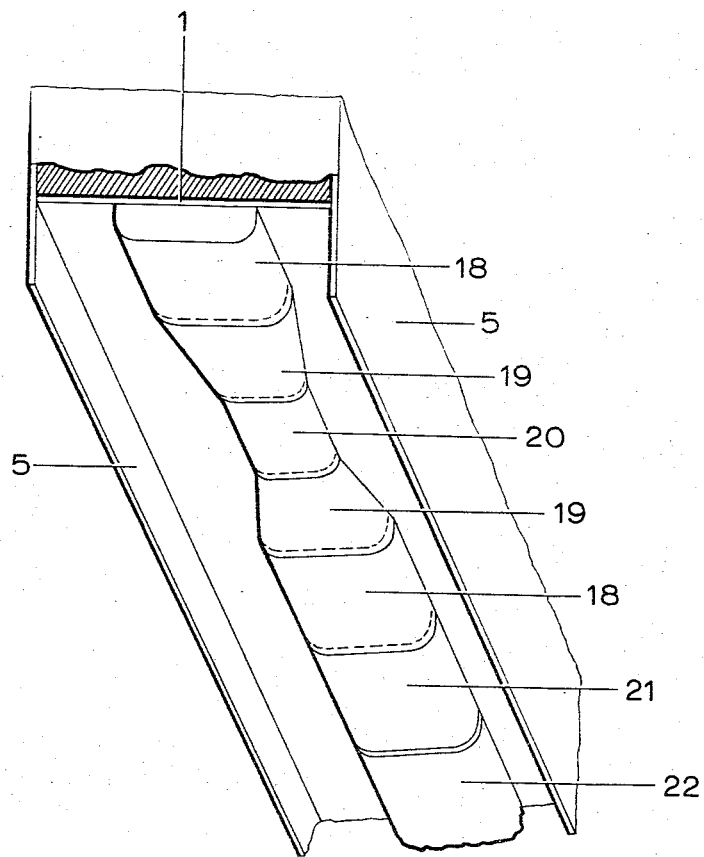
FIGURE 7 is a perspective schematic view of the underside of the vehicle, with the cushion barrier at the end thereof omitted, illustrating a sealing member divided into segments.

The sides of the member 6 are attached to the underside 1 of the vehicle at the positions shown by the crosses 8 in FIGURE 1. The method of attachment is preferably as described in either of British patent specifications Nos. 969,235 (U.S. 3,244,248) and 969,236, but other methods, such as fixing by screws or bolts, may be employed. Similar attachment arrangements are suitable for the upper edges of the restraining members or diaphragms 7. The member 6, as described in copending application 346,971, consists of a plurality of segments 18 to 22 (FIGURE 7) which may vary in size and shape. The narrow segments 20 have sufficient width to maintain co-operation with the guidance strip 4 on those parts of the member 6 situated between the wheels 3. At the ends and the centre of the vehicle wider segments 18 are provided, and segments tapering in width 19 are employed between the narrow segments 20 and the wide segments 18. The segments may overlap and be connected together with releasable attachments in end to end relationship or separate airtight segments may abut without mechanical connection as illustrated in abutment between section 21 and section 22. Pressurized air to inflate the member 6 is supplied by the cushion generating fans via ducts (not shown).

In order to provide flexible or flaccid skirts around the front and rear of the vehicle which will co-operate with the guidance strip without crumpling when the vehicle is rounding a curve there is arranged at each end of the vehicle a hinged framework comprising side members 9 and 10 which are connected to the sides of the vehicle by hinges 11 and 12 respectively. The side members 9 and 10 carry on hinged joints 13 and 14 a member 15, and the member 15 is provided with rollers 16 which co-operate with the guidance strip in the manner of a cam follower, such that when the vehicle is moving over a straight portion of the track the members 9 and 10 are coincident with the sides of the vehicle and the member 15 is coincident with the end of the vehicle.

The flaccid skirt in the region of the framework depends from the members 9, 10 and 15, and has a suitably shaped slot cut in it to provide clearance for the guidance strip 4. When the vehicle rounds a curve which has the minimum radius for which the vehicle and track combination have been designed, the guidance strip 4 assumes the position shown in the dotted outline 4a, and the rollers 16 co-operating with the guidance strip move the members 9, 10 and 15, to the position shown in the dotted outline 9a, 10 and 15a, ensuring that the slot in the skirt remains coincident with the guidance strip 4a. Similarly, the rollers maintain the coincidence between the slot in the skirt and the guidance strip regardless of the relative positions of the vehicle and the guidance strip.

Suitable sealing means are provided between the members 9 and 10 and the underside of the vehicle, so that when a member moves to the position represented by 9a, the pressurised air forming the air cushion does not escape. For example, a flat wedge shape plate of suffiicent size to remain in contact with the underside of the vehicle when the member moves to its maximum offset position may be attached to the top of each side member 9 and 10. Or if preferred, a flexible skirting member could take the place of the rigid plate.

Another embodiment of the invention, which obviates the need for a hinged framework, is illustrated in FIGURE 5. In this arrangement an inflatable flexible member, as previously described, is provided between the locations of the front and rear caliper wheel arrangements, but no such member is provided forward of the foremost wheel arrangement nor aft of the rearmost. The flaccid skirts 5 are adapted to extend along the sides of the vehicle and to extend around at least part of the front and the rear of the vehicle. In the region of the guidance strip 4, the flaccid skirts are continued under the vehicle in the form indicated as 5a to the locations of the caliper wheels 3, such that the shape of the skirts 5a allows clearance for the guidance strip 4, even when the vehicle is rounding a minimum radius curve.

In another embodiment of the invention, flaccid skirts 5b are provided between each pair of caliper wheels 3 and flaccid skirts 5c are provided between the front and the rear caliper wheels 3. The skirts 5c depend from the underside 1 of the vehicle, such that their shape gives clearance for the guidance strip 4, even when the vehicle is rounding a minimum radius curve. The skirt 5, co-operating with the skirts 5a, 5b and 5c, together circumscribe two mutually parallel air cushions, one on each side of the guidance strip 4, and neither the member 6 nor the hinged framework is required.

It will be apparent that various alternative arrangements and modifications may be applied to a vehicle without departing from the scope of the invention. For example, the skirts need not consist of a single sheet, but may be double walled with air or gas jets at their lower extremity. Further, the skirts need not be flexible or flaccid but, because the vehicle will always be operated over a prepared track on which there are no obstructions, may be rigid.

Similarly, the sealing member 6 need not be flexible, but may be rigid and in its rigid form may be arranged as an inverted T with the length of the horizontal members of the T varying along the length of the vehicle, so that they are able to co-operate with the guidance strip when the vehicle is rounding curves.

In addition, this invention need not be restricted to a vehicle with caliper wheels arranged to operate over a flat track. Other types of air cushion vehicles which have critical roll stability problems are those which operate over V and inverted V tracks, and the longitudinal sealing arrangements already described may be applied to them. In the case of the upright V track the sealing member would co-operate with a vertical strip rising from the bottom of the V, and in the case of the inverted V track, the sealing member would co-operate with the apex of the inverted V.

We claim as our invention:

1. An air cushion vehicle which operates over a prepared track having a raised central portion, the vehicle being supported by at least two cushions or pressurized air or gas disposed each side of the central portion, characterized in that the vehicle includes a barrier which extends longitudinally with respect to the vehicle, and which has a flat lower surface to co-operate with the top of the central portion of the track in order to minimize the passage of air from one side of the central portion to the other even when the centre line of the vehicle deviates from the centre line of central portion of the track.

2. An air cushion vehicle as claimed in claim 1, wherein the barrier consists of a plurality of segments releasably attached in end to end relationship.

3. An air cushion vehicle as claimed in claim 1 wherein the barrier is rigid and has a lateral cross section in the form of an inverted T.

4. An air cushion vehicle supported by at least two cushions of pressurised air or gas and adapted to operate over a prepared track having a raised central portion, the vehicle having caliper wheels which locate on the raised central portion and having means to minimise the escape of pressurised air from the cushions and a barrier with a flat lower surface at a substantially uniform distance from the under surface of the vehicle to co-operate with the upper surface of the raised central portion of the track, wherein the width of the flat lower surface varies along the length of the vehicle, being at a minimum at the location of the caliper wheels and increasing as the location moves away from a position adjacent to the caliper wheels such that co-operation between the barrier and the raised central portion is maintained when the centre line of the raised central portion deviates from the longitudinal centre line of the vehicle.

5. An air cushion vehicle supported by at least two cushions of pressurised air or gas and adapted to operate over a prepared track which has a raised central portion, the vehicle being provided with means to minimise the escape of pressurised air from the cushions to the atmosphere and the transfer of pressurised air from one cushion to another, wherein that part of the means to minimise the escape of pressurised air adjacent each end of the vehicle co-operates with the raised central portion of the track and depends from a hinged framework arranged to follow the line of the central strip.

References Cited

UNITED STATES PATENTS 3,164,103   1/1965   Lathers et al.
3,190,235   6/1965   Bertin et al.

ARTHUR L. LA POINT, *Primary Examiner.*

R. M. WOHLFARTH, *Assistant Examiner.*